| United States Patent [19] | [11] | 4,278,780 |
|---|---|---|
| Nishikawa et al. | [45] | Jul. 14, 1981 |

[54] THERMOSETTING RESIN COMPOSITION COMPRISING EPOXY COMPOUND AND REACTION PRODUCT OF UNSATURATED DICARBOXYLIC ACID ANHYDRIDE AND EXCESS DIAMINE

[75] Inventors: Akio Nishikawa; Hiroshi Suzuki; Hisashi Kohkame, all of Hitachi, Japan

[73] Assignees: Hitachi, Ltd.; Hitachi Chemical Co., Ltd., both of Tokyo, Japan

[21] Appl. No.: 55,069

[22] Filed: Jul. 5, 1979

[30] Foreign Application Priority Data

Jul. 12, 1978 [JP] Japan .................................. 53/84004

[51] Int. Cl.$^3$ ...................... C08L 63/04; C08G 73/10; C08G 73/12
[52] U.S. Cl. ............................... 525/488; 260/37 EP; 260/37 N; 260/38; 260/45.7 P; 525/502; 525/504; 528/117; 528/173; 528/183; 528/322; 528/341; 528/345
[58] Field of Search ............... 528/322, 341, 345, 117, 528/173, 183; 525/488

[56] References Cited

U.S. PATENT DOCUMENTS

| 3,562,223 | 2/1971 | Bargain et al. ...................... 528/322 |
| 3,725,345 | 4/1973 | Bargain ................................. 528/322 |
| 3,730,948 | 5/1973 | Akiyama et al. ..................... 528/322 |

*Primary Examiner*—Harold D. Anderson
*Attorney, Agent, or Firm*—Craig and Antonelli

[57] ABSTRACT

A thermosetting resin composition suitable for use as a molding material comprising (a) a reaction product mixture obtained by preferably reacting 1 mole of a dicarboxylic acid anhydride having ethylenic carbon-carbon double bond such as maleic anhydride with 2–20 moles of a diamine such as 4,4′-diaminodiphenylmethane in a molten state and (b) an epoxy compound having more than one 1,2-epoxy group on the average gives a cured product excellent in heat resistance, etc., when cured with heating at a temperature of 150° to 200° C.

18 Claims, 2 Drawing Figures

F I G. 2
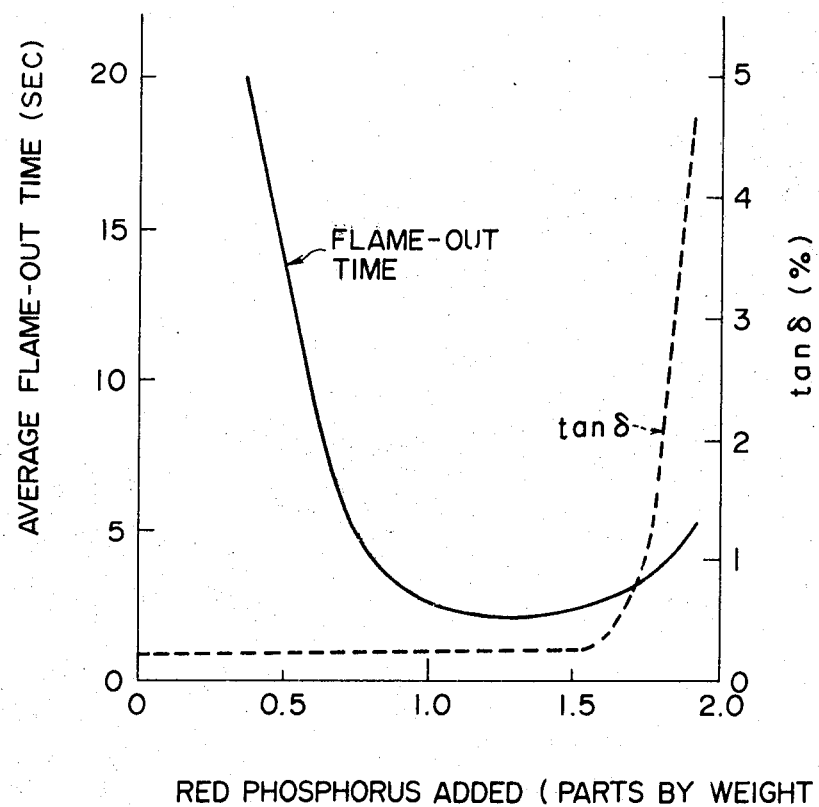

1

THERMOSETTING RESIN COMPOSITION COMPRISING EPOXY COMPOUND AND REACTION PRODUCT OF UNSATURATED DICARBOXYLIC ACID ANHYDRIDE AND EXCESS DIAMINE

BACKGROUND OF THE INVENTION

This invention relates to a thermosetting resin composition suitable for use as a molding material.

Hitherto, polyimide resin, silicone resin and the like are known as resins excellent in heat resistance. However, all these resins are limited in use for reasons that they are all expensive. Polyimide resin has a high fusion temperature and is difficult to mold, and silicone resin has a high permeability to water vapor and has low mechanical strength at high temperatures.

Accordingly, a variety of attempts have been made with the aim of developing a heat resistant material improved in the above-mentioned respects by the use of base materials hitherto employed. Among these heat resistant materials, polyaminobismaleimide resin (U.S. Pat. No. 3,562,223) is noteworthy because of its very small linear expansion coefficient, its excellent mechanical properties at high temperatures and its long heat life. Apart from it, there have been proposed a combination of N,N'-substituted bis-maleimide and a polyamine having maleimide ring obtainable by reacting maleic anhydride with an aromatic diamine (Japanese Pat. Application Kokoku (Post-Exam Publication) No. 16156/1977), a combination of an epoxy compound and a polyaminobismaleimide obtainable by adding a diamine to N,N'-substituted bismaleimide (Japanese Pat. Application Kokoku (Post-Exam Publication) No. 5920/1978) and the like.

However, the above-mentioned polyaminobismaleimide resins still have a fault in that the reaction product between maleic anhydride and a diamine or the N,N'-substituted bis-maleimide compound, i.e. the starting material, is expensive because its synthesis necessitates a large quantity of polar solvent and if such a polar solvent is not used, the reaction cannot proceed uniformly so that the resin composition obtained therefrom is poor in moldability and its cured product is inferior in properties.

SUMMARY OF THE INVENTION

It is an object of this invention to provide a novel thermosetting resin composition giving a cured product excellent in heat resistance.

It is another object of this invention to provide a novel thermosetting resin composition giving a cured product excellent in dielectric loss tangent and flame retardance.

It is yet another object of this invention to provide a novel thermosetting composition suitable for use in transfer molding process.

Other objects and advantages of this invention will be apparent from the descriptions given below.

This invention provides a thermosetting resin composition comprising (a) a reaction product mixture obtained by melt reacting (or conducting a reaction under melting conditions between) a diamine with a dicarboxylic acid anhydride having at least one ethylenic carbon-carbon double bond, said reaction product mixture comprising an imide compound of said diamine and said acid anhydride, an amide compound of said diamine and said acid anhydride and an unreacted part of said diamine and being incapable of gelling per se under heating, and (b) an epoxy compound (epoxide) having more than one 1,2-epoxy group on the average in the molecule, and a cured article obtained by curing said composition with heating.

BRIEF EXPLANATION OF THE DRAWINGS

FIG. 2 illustrates the relation between the amount of red phosphorus added to the thermosetting resin composition of this invention and the flame retardance and dielectric loss tangent (tan δ) of its cured product.

DETAILED DESCRIPTION OF THE PREFERRED EMBODIMENT

Figure 1:
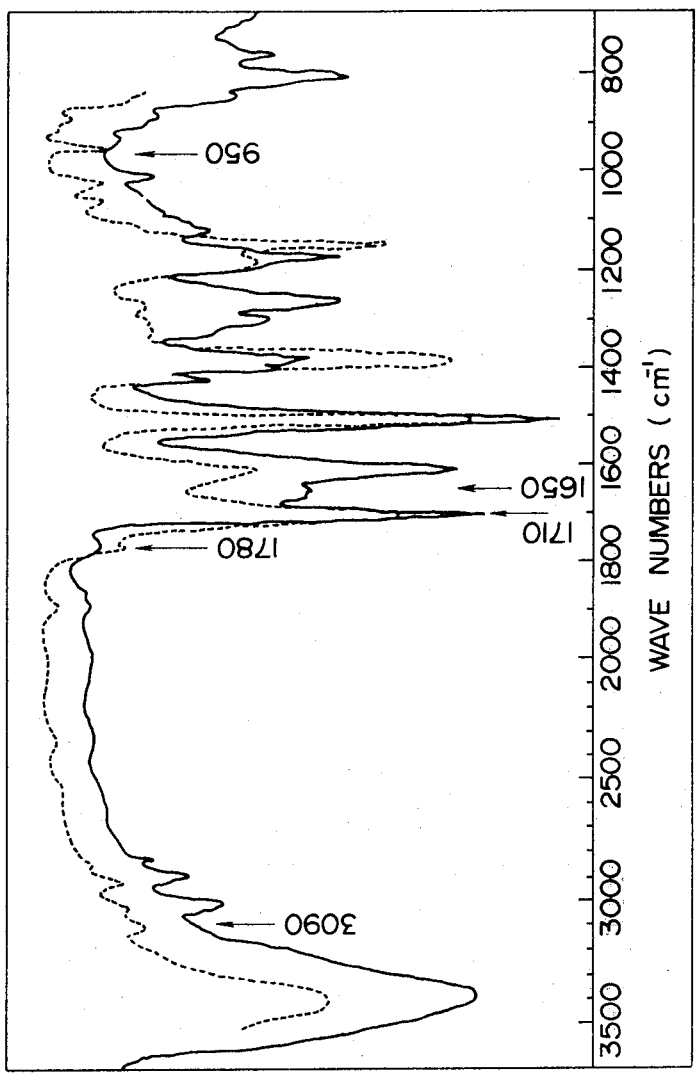
FIG. 1 illustrates an IR spectrum of the reaction product between maleic anhydride and diamine used as a starting material for the thermosetting resin composition of this invention in comparison with an IR spectrum of a conventional polyaminobismaleimide.

As mentioned above, this invention provides a novel thermosetting resin composition giving a thermally cured resin excellent in heat resistance and electrical properties. The characteristic feature of this invention consists in a composition which comprises (a) a reaction product obtainable by reacting a diamine with a dicarboxylic acid anhydride having an ethylenic carbon-carbon double bond in a proportion of preferably 2–20 moles of the diamine per mole of the dicarboxylic acid anhydride in a molten state and (b) an epoxy compound having more than one 1,2-epoxy group on the average.

Said reaction product between the diamine and the dicarboxylic acid anhydride is either liquid at room temperature or has a lower melting point than conventional bis-maleimide compounds, and is far superior to the latter in solubility in organic solvents. In addition, unlike the polyamine compound mentioned in Japanese Pat. Application Kokoku (Post-Exam Publication) No. 16156/1977 produced from maleic anhydride and a diamine, it can be obtained in the form of a uniform reaction product even if no solvent is used in the reaction. This probably owes to the fact that the molar ratio of the diamine to the acid anhydride is higher in the product of this invention than in the conventional one.

When a combined mixture of the above-mentioned reaction product and an epoxy compound is heated at 150°–200° C., there is obtained an excellent cured product. Particularly the thermosetting resin composition of this invention is rapidly curable and can be cured in about one minute at a temperature of 180° C. or above.

In this invention, the diamines include aromatic and alicyclic diamines such as m-phenylenediamine, p-phenylenediamine, dianisidine, 2,6-diaminopyridine, 1,4-naphthylenediamine, 1,5-naphthylenediamine, 2,6-naphthylenediamine, 4,4'-diaminodiphenylmethane, 4,4'-diaminodiphenylpropane, 4,4'-diaminodiphenyl ether, 4,4'-diaminodiphenyl thioether, 4,4'-diaminodicyclohexylmethane, 4,4'-diaminodicyclohexylpropane, 4,4'-diaminodicyclohexyl ether and the like. Among the diamine compounds mentioned above, 4,4'-diaminodiphenylmethane is particularly useful from the viewpoint of a melting point of the reaction product given.

The dicarboxylic acid anhydrides having an ethylenic carbon-carbon double bond usable in this invention are represented by the following formula:

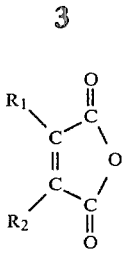

wherein $R_1$ and $R_2$ are independently hydrogen, a methyl group or an ethyl group. Examples of said acid anhydride include maleic anhydride, citraconic anhydride and the like. They may be used alone or in combination of two or more of them.

Said diamine and said dicarboxylic acid anhydride having an ethylenic carbon-carbon double bond are used in a proportion of 2–20 moles of the diamine per mole of the dicarboxylic acid anhydride. When the molten state (hereinafter referred to as "melt reaction") produces in its early stage a product of high degree of polymerization, so that there occurs a partial gelation and the reaction system becomes opaque. If such a product is made into a composition as mentioned later, the resulting composition cannot have flow properties necessary for injection molding. If the amount of said diamine exceeds 20 moles, the amount of the diamine component in the reaction product becomes so large that the epoxy compound cured therewith is not greatly different from those cured with usual diamines and therefore a heat resistant cured product cannot be obtained.

The molar ratio of said diamine to the dicarboxylic acid anhydride is preferably in the range of 2–5 moles, if heat resistance and mechanical strength at high temperatues (for example, at 180° C.) are taken into consideration.

FIG. 1 illustrates the infrared absorption spectrum of the product of melt reaction obtained from 1 mole of said acid anhydride and 2.5 moles of said diamine. In the spectrum, absorptions due to the CO group of imide group are recognized at 1710 cm$^{-1}$ and 1780 cm$^{-1}$ and an absorption due to the amide group is recognized at 1650 cm$^{-1}$, while these absorptions are obscure in the spectrum of the conventional polyaminobismaleimide (the curve expressed by the dotted line). At 2880 cm$^{-1}$ and near 3000 cm$^{-1}$, there are also observable absorptions due to the amino group. On the other hand, absorptions due to ethylenic carbon-carbon double bond, appearing at 3090 cm$^{-1}$ and 950 cm$^{-1}$, are not recognizable.

The above-mentioned infrared absorption spectrum clearly demonstrates that the melt reaction product obtained from said diamine and said dicarboxylic acid anhydride having ethylenic carbon-carbon double bond is a mixture of an imide compound, an amide compound and the unreacted diamine.

Examples of the epoxy compound constituting the composition of this invention include bifunctional epoxy compounds such as diglycidyl ether of bisphenol A, butadiene diepoxide, 3,4-epoxycyclohexylmethyl(3,4-epoxy)-cyclohexanecarboxylate, vinylcyclohexane dioxide, 4,4'-di(1,2-epoxyethyl)-diphenyl ether, 4,4'-(1,2-epoxyethyl)-biphenyl, 2,2-bis(3,4-epoxycyclohexyl)-propane, diglycidyl ether of resorcin, diglycidyl ether of phloroglucin, diglycidyl ether of methylphloroglucin, bis(2,3-epoxycyclopentyl) ether, 2-(3,4-epoxy)-cyclohexane-5,5-spiro(3,4-epoxy)-cyclohexane-n-dioxane, bis(3,4-epoxy-6-methylcyclohexyl) adipate, N,N'-m-phenylenebis(4,5-epoxy-1,2-cyclohexane)-dicarboxyimide and the like; and epoxy compounds having a functionality of 3 or more such as triglycidyl ether of p-aminophenol, polyallyl glycidyl ether, 1,3,5-tri(1,2-epoxyethyl)-benzene, 2,2',4,4'-tetraglycidoxybenzophenone, tetraglycidoxytetraphenylethane, polyglycidyl ether of phenol-formaldehyde novolac, triglycidyl ether of glycerin, triglycidyl ether of trimethylolpropane and the like. More concretely, novolac type epoxy compounds such as ECN 1273 (Ciba Geigy Co.) are preferable.

Said epoxy compound is preferably used in a substantially equimolar quantity to the melt reaction product of the diamine and the acid anhydride as expressed by the following equation:

$$\frac{\text{Number of epoxy groups}}{\text{Number of active hydrogens of the amino group}} \approx 1$$

though the invention is not always limited by it.

Though the object of this invention consists in providing the above-mentioned thermosetting resin composition, said melt reaction product of the diamine and the acid anhydride may also be reacted with an N,N'-substituted bis-maleimide.

If necessary, the thermosetting resin composition of this invention may contain one or more curing catalysts and the following fillers and additives. For example, when the composition is used as a molding material, there may be used an inorganic filler such as zircon, silica, fused quartz glass, clay, aluminum hydroxide, calcium carbonate, quartz glass, glass, asbestos, whisker, gypsum, magnesite, mica, kaolinite, talc, graphite, cement, carbonyl iron, ferrite, a lead compound, molybdenum disulfide, zinc flower, titanium white, carbon black, siliceous sand, wollastonite and the like; a mold release agent such as fatty acid, wax and the like; and a coupling agent such as epoxysilane, vinylsilane, a borane compound, an alkoxytitanate compound and the like. If necessary, conventional flame retardant comprising antimony, a phosphorus compound or the like and a flexibilizer may also be contained.

When the composition is put to uses such as varnish, various solvents may be used. As mentioned later, it is revealed that flame retardance of the cured resin of this invention can be improved without deterioration of electrical properties by adding red phosphorus thereto, which is an excellent effect not found in conventional resins.

This invention will be illustrated more concretely by way of the following examples in which all parts are by weight unless otherwise specified.

PREPARATIVE EXAMPLE OF MELT REACTION PRODUCT 4,4'-Diaminodiphenylmethane (DDM) was heated and melted at 130° C. in a glass vessel, to which was added maleic anhydride (MA) in the proportion shown in Table 1 with stirring. Thus, there formed a yellow-colored infusible product, which released water and foamed after being reacted at from 130° C. to 200° C. for 30 minutes.

When 2 or more moles of 4,4'-diaminodiphenylmethane (DDM) was added to 1 mole of maleic anhydride (MA) (Sample Nos. 1–6 in Table 1), the liquid reaction mixture became yellow-brown and transparent. On the other hand, when 1.8 moles or less of DDM was added to it (Sample Nos. 7-9), the reaction mixture did not become transparent and did partially form a gel even at a temperature of 200° C. When 1.25 moles of DDM was added, the entire reaction mixture began to gel. If such a product as typified by the latter two is made into a composition together with an epoxy compound, the composition has only a short storage life and cannot have flow properties necessary for injection molding.

Table 1 lists molar ratio DDM/MA, melting point of melt reaction product and its appearance.

TABLE 1

| Sample No. | 1 | 2 | 3 | 4 | 5 | 6 | 7 | 8 | 9 |
|---|---|---|---|---|---|---|---|---|---|
| DDM/MA (molar ratio) | 20 | 10 | 5 | 3.3 | 2.5 | 2.0 | 1.8 | 1.4 | 1.25 |
| Melting point of reaction product (°C.) | Liquid | Liquid | Liquid | 41-56 | 66-73 | 107-115 | 118-125 | 126-135 | 135-147 |
| Appearance of reaction product | Transparent | Transparent | Transparent | Transparent | Transparent | Transparent | Opaque | Opaque | Opaque |

COMPARATIVE EXAMPLE 1

Among the samples shown in Table 1, that having a DDM/MA molar ratio of 1.8 (Sample No. 7) and that having a DDM/MA molar ratio of 2.0 (Sample No. 6) were heated at 180°-200° C. for an additional about 30 minutes. Thus, Sample No. 7 gave a gelatinous product, while Sample No. 6 maintained the liquid state (solid at room temperature) without forming a gel. When the latter sample was heated further at 200°-250° C., it did not gel but the liquid sample blackened with evolution of a gas and decomposed.

EXAMPLE 1

Each 50 parts of Sample No. 6 and No. 7 was mixed with 100 parts of Epoxy Novolac ECN 1273 (manufactured by Ciba Geigy Co., softening point 73° C., epoxy equivalent 225), 2 parts of stearic acid as a mold release agent, 370 parts of quartz glass powder QG-100 (manufactured by Toshiba Ceramics Co., Ltd.) as a filler, 1 part of Epoxysilane KBM 403 (manufactured by Shin-etsu Chemical Industries Co., Ltd.) as a coupling agent and 1 part of carbon black. Thus, two kinds of compositions were obtained.

Then, the compositions were examined for blending properties by means of a twin roll having a diameter of about 20 cm (8 inches) and adjusted to a temperature shown in Table 2. As a result, it was found that, when the reaction product of Sample No. 7 is used, the composition cannot be kneaded uniformly and is difficult to make into a sheet in the usually employed roll temperature range of 50°-120° C. This is considered due to the local formation of gelatinous matter in the reaction product of Sample No. 7 and to the high melting point of the reaction product itself. Accordingly, it is impossible to obtain a molding material from the reaction product of Sample No. 7.

On the other hand, it was found that, when the reaction product of Sample No. 6 is used, the composition can be formed into a sufficiently uniform sheet in the roll temperature range of 50°-120° C. so that a molding material can be obtained therefrom.

TABLE 2

| Reaction product | Roll temperature (°C.) | | | |
|---|---|---|---|---|
| | 50-60 | 70-80 | 90-100 | 110-120 |
| Sample No. 6 | o | o | o | o |
| Sample No. 7 | x | x | x | Δ |

Note
o: Formable into a sheet on the roll
Δ: Temporarily formable into sheet on the roll
x: Not formable into a sheet on the roll

EXAMPLE 2

Four kinds of compositions shown in Table 3 were prepared by incorporating the reaction product of Sample No. 5 of Table 1 with ECN 1273, undecyl-1-triazineimidazole (a curing accelerator) and some other ingredients.

Each of the compositions thus obtained was kneaded on roll at 80°-100° C., introduced into an appointed molding die, and cured at 180° C. for 5 minutes to give molded articles A-D. Then, glass transition temperatures, bending strengths (at 180° C.) and retention of bending strength after heating at 200° C. for 30 days of these molded articles were measured. The results are summarized in Table 3.

TABLE 3

| | Molded article | | | |
|---|---|---|---|---|
| | A | B | C | D |
| Composition (parts) | | | | |
| Reaction product of Sample No. 5 | 30 | 40 | 50 | 60 |
| ECN 1273 | 100 | 100 | 100 | 100 |
| Curing accelerator | 2 | 2 | 2 | 2 |
| Mold release agent: stearic acid | 2 | 2 | 2 | 2 |
| Quartz glass powder | 322 | 346 | 370 | 394 |
| Coupling agent* | 1 | 1 | 1 | 1 |
| Properties of molded article | | | | |
| Glass transition temperature (°C.) | 206 | 204 | 200 | 146 |
| Bending strength (kg/cm$^2$) | 420 | 530 | 500 | 250 |
| Retention of bending strength after heating at 200° C. for 30 days (%) | 88 | 92 | 101 | 80 |

Note
*Epoxysilane (manufactured by Shin-etsu Chemical Industries Co., Ltd.; KBM 403)

EXAMPLE 3

Using Sample No. 6 of Table 1, the compositions and molded articles A', B', C' and D' of Table 4 were prepared in the same manner as described in Example 2. Properties of the compositions and molded articles were measured to obtain the results shown in Table 4.

TABLE 4

| | Molded article | | | |
|---|---|---|---|---|
| | A' | B' | C' | D' |
| Composition (parts) | | | | |
| Reaction product of Sample No. 6 | 30 | 40 | 50 | 60 |
| ECN 1273 | 100 | 100 | 100 | 100 |

TABLE 4-continued

|  | Molded article | | | |
|---|---|---|---|---|
|  | A' | B' | C' | D' |
| Stearic acid | 2 | 2 | 2 | 2 |
| Quartz glass powder | 320 | 344 | 366 | 388 |
| KBM 403 | 1 | 1 | 1 | 1 |
| Properties of the composition | | | | |
| Moldability: Spiral Flow* 180° C., 70 kg/cm² (inch) | 38 | 31 | 27 | 23 |
| Storage stability (at room temperature, R.H. 60%) (days) | 30 | 30 | 30 | 30 |
| Properties of the molded article | | | | |
| Glass transition temperature (°C.) | 205 | 208 | 211 | 206 |
| Bending strength (at 180° C., kg/cm²) | 495 | 570 | 590 | 570 |
| Retention of bending strength after heating at 200° C. for 30 days (%) | 89 | 95 | 100 | 99 |

Note
*Society of Polymer Institute EMMI 1-66: 20 g of a composition is melted at an appointed temperature and extruded through a nozzle having an diameter of 4 mm under an appointed pressure and the amount of the composition extruded is expressed in terms of length (inch).

Table 4 demonstrates that the compositions of this invention have flow properties necessary for molding (20 inches or more in terms of Spiral Flow).

COMPARATIVE EXAMPLE 2

In a 2 liter flask equipped with a stirrer, a thermometer and a dropping funnel was placed a solution of 50 g of MA in a mixture of acetone and toluene (the concentration of MA in the solution was about 5%), into which was poured a solution of 100 g of DDM in acetone. With stirring, the mixture was reacted for 30 minutes while elevating the temperature from room temperature to 50° C. In this reaction, the molar ratio DDM/MA was approximately 1. The reaction mixture was filtered and dried to give a reaction product.

The reaction product was mixed with an epoxy compound and other ingredients in the proportions mentioned in Table 5 to give two kinds of compositions. The compositions were kneaded for 7 minutes by means of a twin roll having a diameter of about 20 cm (8 inches) kept at 70°-80° C. to give molding material compositions. In order to know their moldability, their spiral flows were measured. However, they exhibited only poor flow properties, so that they could not be transfer-molded. Accordingly, they were compression molded under the conditions of 180° C., 500 kg/cm² and 5 minutes. Properties of the molded articles are shown in Table 5.

TABLE 5

|  |  | Molded article | |
|---|---|---|---|
|  |  | a | b |
| Composition (parts) | Reaction product | 50 | 100 |
|  | ECN 1273 | 100 | 100 |
|  | Stearic acid | 2 | 2 |
|  | Quartz glass | 106 | 142 |
|  | Carbon black | 1 | 1 |
| Properties of press molded article | Bending strength at 180° C. (kg/cm²) | 370 | 400 |
|  | Appearance | Superficial blisters and internal voids | The same as the left |
| Retention of bending strength after heating at 200° C. for 30 days (%) |  | 65 | 88 |

EXAMPLE 4

Using the reaction products of Sample No. 2 and No. 6 shown in Table 1, the compositions of Table 6 were prepared and transfer molded under the conditions of 180° C., 70 kg/cm² and 3 minutes to give molded articles E and F.

TABLE 6

|  |  | Molded article | |
|---|---|---|---|
|  |  | E | F |
| Composition (parts) | Sample No. of reaction product | No. 2 | No. 6 |
|  | Amount of the reaction product | 20 | 40 |
|  | ECN 1273 | 100 | 100 |
|  | Curing accelerator: KBM 403 | 4 | 4 |
|  | Steaic acid | 1 | 1 |
|  | Hoechst wax | 1 | 1 |
|  | Carbon black | 1 | 1 |
|  | Quartz glass | 89 | 103 |
| Properties of molded article | Glass transition temperature (°C.) | 173 | 212 |
|  | Bending strength at 180° C. (kg/cm²) | 350 | 470 |
|  | Retention of bending strength after heating at 200° C. for 30 days (%) | 89 | 103 |

EXAMPLE 5

100 Parts of 4,4'-diaminodiphenyl ether (DDE) was heated and melted at 150° C., to which was added 20 parts of MA. The mixture was reacted for 30 minutes while elevating the temperature from 160° C. to 200° C. Thus, a reaction product (Sample No. 10) was obtained. 50 Parts of DDM was heated and melted at 140° C., to which was added 25 parts of MA. The mixture was reacted for 30 minutes while elevating the temperature from 160° C. to 200° C. Thus, a reaction product (Sample No. 11) was obtained.

100 Parts of DDM was heated and melted at 150° C., to which was added 22 parts of citraconic anhydride (EA). The mixture was reacted for 30 minutes while elevating the temperature from 160° C. to 200° C. Thus, a reaction product (Sample No. 12) was obtained.

100 Parts of 4,4'-diaminodicyclohexylmethane (DDCHM) was heated and melted at 140° C., to which was added 22 parts of MA. The mixture was reacted for 30 minutes while elevating the temperature from 160° C. to 200° C. Thus, a reaction product (Sample No. 13) was obtained.

Each of the reaction products was blended with a hydantoin epoxy resin (Araldite XB-2818; manufactured by Ciba-Geigy Co.) in proportions shown in Table 7. The compositions thus obtained were kneaded by means of a twin roll having a diameter of 20 cm at 70°-80° C. for 7 minutes to give molding materials. They were molded under the conditions of 180° C., 70 kg/cm² and 3 minutes to give molded articles G to K. Their properties were measured to obtain the results shown in Table 7.

TABLE 7

| | Molded article | | | | |
|---|---|---|---|---|---|
| | G | H | I | J | K |
| Composition (parts) | | | | | |
| Sample No. of reaction product | 10 | 11 | 12 | 13 | 13 |
| Amount of the reaction product | 55 | 55 | 55 | 55 | 40 |
| Araldite XB-2818 | 100 | 100 | 100 | 100 | 100 |
| Stearic acid | 2 | 2 | 2 | 2 | 2 |
| KBM 403 | 1 | 1 | 1 | 1 | 1 |
| Quartz glass powder | 370 | 370 | 370 | 370 | 346 |
| Carbon black | 1 | 1 | 1 | 1 | 1 |
| Properties of molded article | | | | | |
| Glass transition temperature (°C.) | 210 | 208 | 185 | 185 | 205 |
| Bending strength at 180° C. (kg/cm²) | 560 | 590 | 565 | 540 | 580 |
| Retention of bending strength after heating at 200° C. for 30 days (%) | 100 | 100 | 95 | 88 | 97 |

EXAMPLE 6

100 Parts of DDM was heated and melted at 130° C., to which was added 25 parts of MA. The mixture was reacted for 30 minutes while elevating the temperature from 160° C. to 200° C. Thus, a reaction product (Sample No. 14) was obtained. Finely powdered red phosphorus was added to the reaction product and the mixture was melted and homogenized to give four kinds of mixtures having different contents of red phosphorus. They were blended with ECN 1273 and other additives in proportions shown in Table 8 and then kneaded by means of a twin roll having a diameter of 20 cm at 70°–80° C. for 7 minutes to give molding materials for use in press molding process.

In order to investigate their properties, they were cured under the conditions of 180° C., 70 kg/cm² and 1 minute to give molded articles L to O, and they were examined for flame retardance, dielectric loss tangent and change of bending strength caused by heat deterioration (retention of bending strength after deterioration based on its initial value). The results are summarized in Table 8.

FIG. 2 illustrates the effect of the amount of the added red phosphorus on flame retardance and dielectric loss tangent (tan δ).

TABLE 8

| | Molded article | | | |
|---|---|---|---|---|
| | L | M | N | O |
| Composition (parts) | | | | |
| Reaction product (Sample No. 14) | 55 | 55 | 55 | 55 |
| Red phosphorus | 0.4 | 0.9 | 1.3 | 3.5 |
| ECN 1273 | 100 | 100 | 100 | 100 |
| Stearic acid | 2 | 2 | 2 | 2 |
| Coupling agent: KBM 403 | 1 | 1 | 1 | 1 |
| Quartz glass powder | 384 | 388 | 390 | 396 |
| Carbon black | 1 | 1 | 1 | 1 |
| Properties of molded article | | | | |
| Flame retradance [UL-94]* | 6.5 | 3.9 | 2.1 | 4.9 |
| Average flame-out time (sec) | (V-1) | (V-0) | (V-0) | (V-0) |
| electrical property, tan δ at 50 Hz (%) | 0.22 | 0.22 | 0.24 | 7.1 |
| Bending strength at 180° C. (kg/cm²) | 575 | 575 | 575 | 570 |
| Retention of bending strength after heating at 200° C. for 30 days (%) | 100 | 100 | 100 | 100 |

(Note)
*Class V-0: Average flame-out time of less than 5 seconds
Class V-1: Average flame-out time of 5–30 seconds As is understandable from FIG. 2, flame retardance of Class V-O, according to UL-94 standard, can be obtained by adding 0.5 to 2 parts of red phosphorus to 100 parts of the resin component. Moreover, when the amount of phosphorus added does not exceed about 2 parts, the effect of red phosphorus on dielectric loss tangent is so small that the composition obtained can be said to be quite excellent as electrically insulating material.

Additionally speaking, a usual epoxy resin, urethane resin, vinyl chloride resin and the like can be flame-retarded to the same extent to above only when 5–10 parts of flame retardant such as red phosphorus is added thereto.

What is claimed is:

1. A thermosetting resin composition comprising
   (a) a reaction product mixture obtained by melt reacting 2 to 20 moles of a diamine with 1 mole of a dicarboxylic acid anhydride having at least one ethylenic carbon-carbon double bond, and
   (b) an epoxy compound having more than one 1,2-epoxy group on the average in the molecule.
2. A composition according to claim 1, wherein the diamine is an aromatic diamine.
3. A composition according to claim 2, wherein the aromatic diamine is 4,4'-diaminodiphenylmethane.
4. A composition according to claim 1, wherein the diamine is 4,4'-diaminodiphenyl ether or 4,4'-diaminodicyclohexylmethane.
5. A composition according to claim 1, wherein the dicarboxylic acid anhydride is one having the formula:

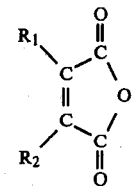

wherein $R_1$ and $R_2$ are independently hydrogen, methyl or ethyl.

6. A composition according to claim 5, wherein the dicarboxylic acid anhydride is maleic anhydride.
7. A composition according to claim 5, wherein the dicarboxylic acid anhydride is citraconic anhydride.
8. A composition according to claim 1, wherein the epoxy compound is a novolac epoxy compound.
9. A composition according to claim 1, which gives a spiral flow of 20 inches or more measured under the conditions of 180° C. and 70 kg/cm².
10. A composition according to claim 1, 2, or 5 wherein the reaction product mixture is obtained by melt reacting one mole of maleic anhydride with 2 to 5 moles of an aromatic diamine.
11. A cured product obtained by curing with heating the composition of claim 1.
12. A cured product obtained by curing with heating the composition of claim 2.
13. A cured product obtained by curing with heating the composition of claim 3.
14. A cured product obtained by curing with heating the composition of claim 6.
15. A cured product obtained by curing with heating the composition of claim 8.

16. A cured product obtained by curing with heating the composition of claim 9.

17. A cured product obtained by curing with heating the composition of claim 10.

18. A thermosetting resin composition comprising a melt reaction product of a diamine and a dicarboxylic acid anhydride having an ethylenically unsaturated double bond, said reaction product being a mixture comprising an imide compound of said diamine and said acid anhydride, an amide compound of said diamine and said acid anhydride and an unreacted part of said diamine and being incapable of gelling per se under heating, and an epoxide having in the molecule more than one 1,2-epoxy group on the average.

* * * * *